Dec. 3, 1946.   G. M. WHITMORE   2,412,022
WELDING DEVICE
Filed May 10, 1944
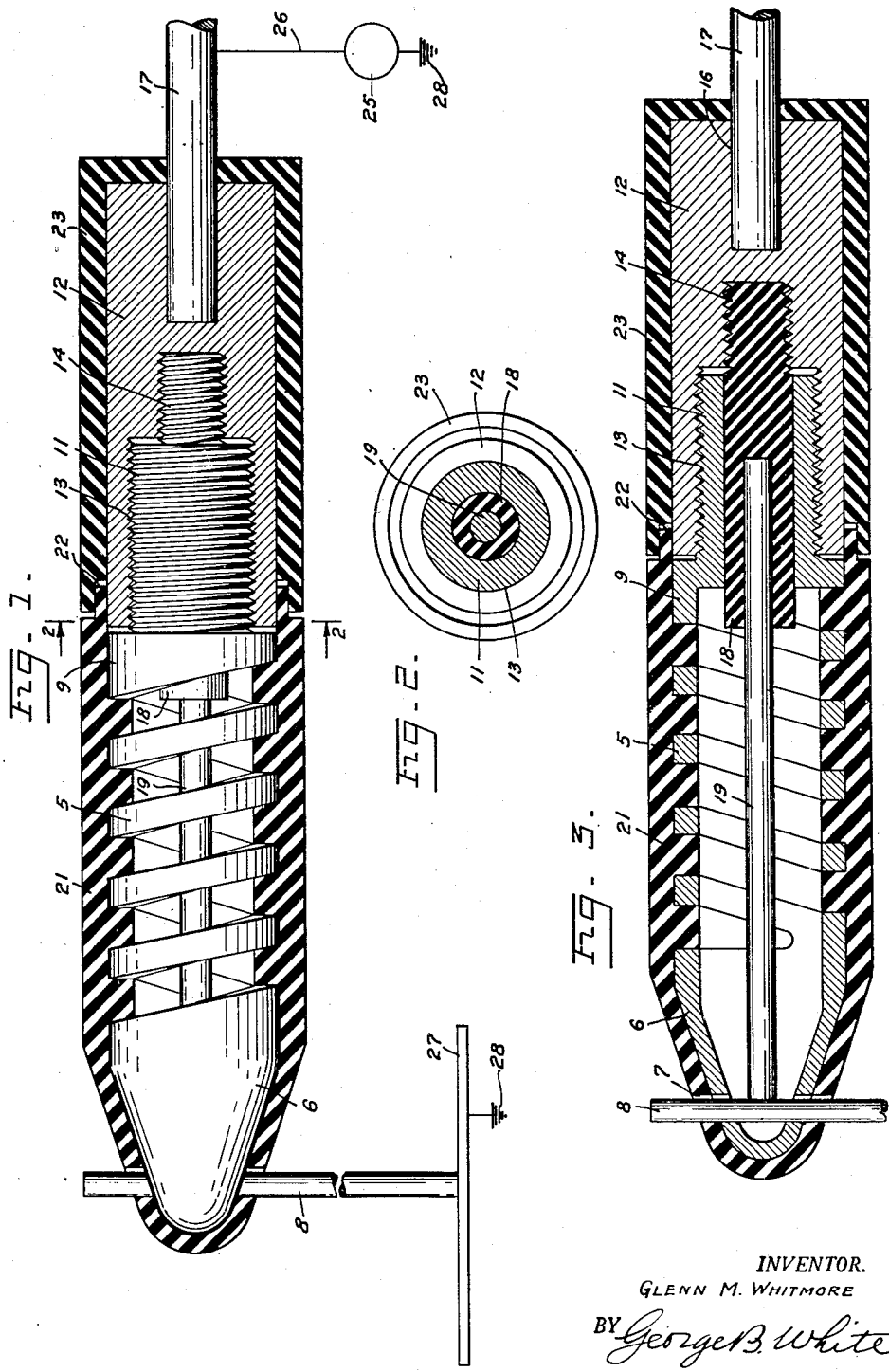
INVENTOR.
GLENN M. WHITMORE
BY George B. White
ATTY.

Patented Dec. 3, 1946

2,412,022

UNITED STATES PATENT OFFICE 2,412,022

WELDING DEVICE

Glenn M. Whitmore, Oakland, Calif.

Application May 10, 1944, Serial No. 534,904

8 Claims. (Cl. 219—8)

This invention relates to a method and device for holding welding electrodes and for the counteracting of electric or electro-magnetic action in the electrode by an auxiliary field.

An object of the invention is to provide a method of holding an electrode and conveying to the electrode the welding current and providing a secondary magnetic field created by the same welding current on its path toward said electrode, in such position as to counteract electric or electro-magnetic molecular disturbances in the electrode which may resist or disturb the efficiency of the flow and action of the welding current in the electrode.

Another object of the invention is to provide a holder for a welding electrode in which the current is so conducted to the electrode that it creates a secondary magnetic field in a core, which core is insulated from the holder but is used as the clamping contact for the electrode.

Another object of this invention is to provide an electrode holder which conveniently grips the electrode and conducts the welding current to the electrode and it also creates a magnetic field within it, insulated from the holder but contacted with the electrode.

Another object of this invention is to provide an electrode holder which is highly useful and simple in construction. Convenience of arrangement, lightness and comparative inexpense of manufacture are further objects which have been borne in mind in the production and development of the invention.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawing.

With the foregoing and other objects in view, which will be made manifest in the following detailed description, reference is had to the accompanying drawing for the illustrative embodiment of the invention, wherein:

Fig. 1 is a partly sectional view of the electrode holder showing the coil in elevation.

Fig. 2 is a cross-sectional view taken on lines 2—2 of Fig. 1, and

Fig. 3 is a full sectional view of the electrode holder.

In electric methods where electrodes are used so that the welding current flows from the welding generator through the electrode in a holder and through the work there are several disadvantages among which is the excessive splattering of the molten material from the crater under the welding arc. According to certain recent theories the efficiency of the welding current in the rod after a certain initial welding operation is reduced, and the splattering increased, as well as the density of the weld in the crater being affected by some molecular disturbance throughout the entire welding rod which is due to a magnetic field set up by a rearrangement of the molecules under the influence of the welding current. The theory of such a magnetic field may be just one of the theoretical explanations of the reason for the aforesaid disadvantage and applicant does not wish to be limited to that one explanation or theory. Irrespective of the actual molecular or magnetic action, applicant succeeded in eliminating excessive splatter and improving the efficient action of the welding current in the electrode and the adhering of particles to parts of the electrode distant from the point of welding. These objects are accomplished by applicant by the steps of conducting the welding current to the electrode through a coil, providing in the coil a magnetic field of about the same nature as that provided in solenoids, and contacting the core on which the magnetic field is created with the electrode at an angle but insulated from the coil. Following the theory of the primary magnetic field created in the electrode, applicant believes that this secondary magnetic field created by the solenoid-like coil and by the welding current as it is passed to the electrode creates a balancing action so as to counteract the magnetic or molecular disturbances in the electrode and facilitate the efficient flow of the welding current to the crater so as to weld with the minimum splattering and with the greatest effectiveness. At any rate the practical operation of applicant's method and device eliminates the aforesaid disadvantages and results in a much better and cleaner welding operation.

A preferred structural embodiment of the invention is illustrated in the drawing. The particular electric fields heretofore mentioned are accomplished through an electrode holder. This holder is made of two sections. An open coil section 5 terminates at one end in a substantially conical holder head 6, which is provided with transverse holes through which the electrode 8 is extended substantially at right angles to the axis of the coil 5. At the other end of the coil section 5 is a base 9 with an externally threaded boss 11 extended rearwardly. The entire coil section 5, the head 6 and the base 9 and boss 11 are hollow, as shown particularly in Fig. 3 of the drawing.

A handle section 12 has an internally threaded recess 13 at an end thereof threaded on the boss 11 for holding the two sections together. At the base of the recess 13 is a threaded socket 14. In the other end of the handle section 12 is a socket 16 into which is fixed by welding or in other suitable manner, a cable 17 for conducting the welding current to the holder.

An insulator bushing is extended through the base 9 and the boss 11 and is threaded into the socket 14 of the handle section 12. Into this insulating bushing 18 is fixed a conductor core in the form of a bar 19 which extends into the head 6 of the forward section and is in alignment with the holes 7. When the handle section 12 is tightened up on the boss 11 of the forward section it pushes the bushing 18 and the bar 19 against the electrode 8. Thus the bar 19 is used for clamping the electrode 8 at a point between the holes 7 and against or toward the point of the head 6 of the holder. It is to be noted that the bushing 18 is slidable and rotatable in the boss 11 so that it can freely move back and forth as the handle section 12 is turned in the respective directions for tightening or loosening the clamping on the electrode 8.

The entire holder is insulated. The insulating jacket 21 is formed so that it extends around and between the turns of the coil 5 to the inner peripheries of said turns. The jacket 21 extends all around the exterior of the head 6 and also over the outer circumference of the base 9 and beyond the base. The portion of the insulated jacket 21 which extends beyond the base 9 is reduced in diameter so as to provide an overlapping connection with a socket 22 in the adjacent end of an insulated jacket 23 which covers the entire handle section 12. In this manner the entire holder is properly insulated so it can be safely held in the hands for the welding operation. At the same time by merely turning the handle portion, the electrode can be clamped or released at will. In addition the proper insulation of the coil 5 assures the flowing of the welding current on its path as determined by the coil 5 and to the head 6. The core bar 19 is insulated from the welding current by its hollow bushing 18 but is itself centrally located in the coil 5 and is subject to the action of the magnetic field created by the current passing through said coil 5. Therefore the core bar 19 has a double function, namely, the clamping of the electrode 8 in place, and the exerting of its magnetic and electric force upon a point of the electrode 8 spaced from its contact points with the welding current in the holes 7. The electric circuit therefore is completed as follows: from the welding generator 25 through a line 26 the current flows to the cable 17 and then through the handle section 12 and the boss 11 to the base 9 and through the coils 5 to the head 6 and at the contact points in the holes 7 to the electrode 8 and to the work indicated at 27. The circuit is completed through the usual grounds 28 and it includes the usual controls in such welding circuits not herein shown. It was found that by applicant's holder and the particular action of the welding circuit as herein described upon the electrode, excessive splattering of the molten material is limited, a more uniformly efficient welding is accomplished and the control of the welding operation is greatly facilitated.

It was also found in practice that the auxiliary magnetic field created in the holder coacts with the magnetic field around the welding electrode for directing the molten particles at the end of the electrode into the crater so that the movement of molten metal is confined to the crater area without sidewise splatter. It also eliminates arc blow and stabilizes the welding arc.

I claim:

1. A welding electrode holder comprising a hollow body formed in the shape of a coil and connected to a welding circuit, a hollow head at one end of said body adapted to receive a welding electrode therethrough and to conduct the welding current to said electrode, a core positioned longitudinally in the magnetic field of said coil and extended into said head, and means to press said core in clamping contact with said welding electrode.

2. A welding electrode holder comprising a hollow body formed in the shape of a coil and connected to a welding circuit, a hollow head at one end of said body adapted to receive a welding electrode therethrough to conduct the welding current to the electrode, a core positioned longitudinally in the magnetic field of said coil and extended into said head at an angle to said electrode, means to press said core into clamping contact with said welding electrode, said core being insulated from said hollow element.

3. A welding electrode holder comprising a hollow section formed in the shape of a coil, a hollow head at one end of said hollow element adapted to receive a welding electrode therethrough, a base on the other end of said hollow element, a handle section adjustably secured to said base and adapted to conduct welding current to said base, an insulating core holder adjustably extended through said base and held in said handle section for adjustment with said handle section, and a clamping core in said insulating holder extended into said hollow element and said head for clamping said welding electrode into said head.

4. A welding electrode holder comprising a hollow coil element, a head at one end of said element adapted to receive a welding electrode therethrough, means to adjustably hold a core in said hollow element and in said head for clamping said electrode in place, means to conduct welding current to said electrode through said hollow element to form a magnetic field at an angle to the axis of said electrode, and an insulating covering for said hollow element extended into the spaces between the turns of said coil to insulate said turns from each other.

5. A welding electrode holder comprising a hollow section, the body of said hollow section being formed in the shape of a coil, a head formed at one end of the hollow section having transverse holes to receive a welding electrode therein, a base on said hollow section, a handle section threadedly secured on said base and connected to the welding current, said hollow section and said handle section being electrical conductors to conduct the welding current to and through said coil to the head of said hollow section and to said electrode; an insulator element secured in said handle section and adjustably extended through said base, and a conductor core element held in said insulator and extended through said hollow section to said electrode and being pressed in clamping contact with said electrode by said handle section at substantially right angles to the portion of the electrode extended through said head, and means to insulate the exteriors of said holder sections.

6. In a welding electrode holder, a holder head having an aperture to hold an electrode therein, a conductor coil from the holder head conducting welding current to said head and to said electrode and forming a magnetic field at an angle to the axis of the electrode, a core movable axially in said coil and in said magnetic field being insulated from said coil and being in clamping contact with said electrode to clamp said electrode in said head, and means for moving said core toward and away from said electrode.

7. In a welding electrode holder, a holder head adapted to hold an electrode, a conductor coil extending from the holder head conducting welding current to said head and to said electrode and forming a magnetic field at an angle to the axis of the electrode, a core movably held axially in said coil, an end of said core contacting said electrode, the other end of the core being insulated from the welding current, and an element for holding and adjusting said core for contacting and releasing said electrode.

8. In a welding electrode holder, a holder head having an aperture to hold an electrode therein, a conductor coil extending from the holder head conducting welding current to said head and to said electrode and forming a magnetic field at an angle to the axis of the electrode, a core movable axially in said coil and in said magnetic field being insulated from said coil and being in clamping contact with said electrode to clamp said electrode in said head, and means for moving said core toward to and away from said electrode, and an insulating cover surrounding said coil and extended into the spaces between the turns of said coil to about the inner periphery of said coil.

GLENN M. WHITMORE.